United States Patent
Kumazawa et al.

(10) Patent No.: US 10,184,069 B2
(45) Date of Patent: Jan. 22, 2019

(54) SILICA-BASED POLISHING PARTICLE AND ABRASIVE

(71) Applicant: JGC CATALYSTS AND CHEMICALS LTD., Kanagawa (JP)

(72) Inventors: Mitsuaki Kumazawa, Fukuoka (JP); Miki Egami, Fukuoka (JP); Hirotada Arakane, Fukuoka (JP); Ryo Muraguchi, Fukuoka (JP); Toshiharu Hirai, Kanagawa (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 0 days.

(21) Appl. No.: 15/829,128

(22) Filed: Dec. 1, 2017

(65) Prior Publication Data
US 2018/0155591 A1 Jun. 7, 2018

(30) Foreign Application Priority Data

Dec. 2, 2016 (JP) .................. 2016-235227

(51) Int. Cl.
*C09G 1/02* (2006.01)
*C09K 3/14* (2006.01)
*C01B 33/12* (2006.01)

(52) U.S. Cl.
CPC ............... *C09G 1/02* (2013.01); *C01B 33/12* (2013.01); *C09K 3/1409* (2013.01); *C01P 2004/54* (2013.01); *C01P 2004/64* (2013.01)

(58) Field of Classification Search
CPC .......... B24D 3/00; C09K 3/14; C09K 3/1409; C09G 1/00; C09G 1/02; H01L 21/304;
(Continued)

(56) References Cited

U.S. PATENT DOCUMENTS

| | | | | |
|---|---|---|---|---|
| 6,652,612 | B2 * | 11/2003 | Nakashima | ............ B82Y 30/00 106/3 |
| 2014/0017496 | A1 * | 1/2014 | Fuji | ......................... C01B 33/18 428/402 |
| 2017/0001870 | A1 * | 1/2017 | Yoshitake | ............. C01B 33/145 |

FOREIGN PATENT DOCUMENTS

| | | | |
|---|---|---|---|
| JP | H01234319 A | † | 9/1989 |
| JP | H07206451 A | † | 8/1995 |

(Continued)

OTHER PUBLICATIONS

Yasuo Azuma, et. al., Synthesis of Spherical Silica Particles and their Thermal Behavior, Journal of the Ceramic Association, Japan, vol. 94[6], p. 559 (p. 560, section 3.2, second paragraph), Jun. 1, 1986.†

*Primary Examiner* — Jennifer A Smith
*Assistant Examiner* — Alexandra M Moore
(74) *Attorney, Agent, or Firm* — Greenblum & Bernstein, P.L.C.

(57) ABSTRACT

Provided is a silica-based polishing particle, particularly suitable for primary polishing, which provides a high polishing rate on the surface of a substrate and which prevents particle residues on the substrate after polishing, and an abrasive including the silica-based polishing particle. A silica-based polishing particle with a three-dimensional polycondensation structure containing an alkoxy group, wherein the particle has an average particle diameter (d) of 5 to 300 nm, an aspect ratio of more than 1.20 and 5.00 or less, and a carbon content of 0.005% by mass or more and less than 0.50% by mass.

7 Claims, 1 Drawing Sheet

(58) Field of Classification Search
CPC ......... H01L 21/30625; H01L 21/31053; H01L 21/3212; H01L 21/7684; C01B 33/18; C01P 2004/32; C01P 2004/62; C01P 2004/64; C01P 2006/12; C01P 2006/18; B24C 11/00; B24C 11/005; C08K 3/34; C08K 3/36
See application file for complete search history.

(56) References Cited

FOREIGN PATENT DOCUMENTS

| | | | |
|---|---|---|---|
| JP | H07277752 | † | 10/1995 |
| JP | H09-324174 A | | 12/1997 |
| JP | 2003-213249 A | | 7/2003 |
| JP | 2004315300 A | † | 11/2004 |
| JP | 2005-060217 A | | 3/2005 |
| JP | 2010083744 A | † | 4/2010 |
| JP | 2013-082584 A | | 5/2013 |
| WO | 2013085574 A1 | † | 6/2013 |
| WO | WO-2015087965 A1 | * | 6/2015 ........... C01B 33/145 |

\* cited by examiner
† cited by third party

SILICA-BASED POLISHING PARTICLE AND ABRASIVE

BACKGROUND OF THE INVENTION

Field of the Invention

The present invention relates to a silica-based polishing particle useful for flattening of a substrate, in particular, for formation of a metal wiring layer on a semiconductor integrated circuit, etc., and an abrasive comprising the polishing particle.

Description of the Related Art

Various integrated circuits are used for computers and various electronic devices. As they are downsized and become sophisticated, higher density and higher performance have been required for circuits.

To produce a semiconductor integrated circuit, for example, an interlayer film (insulating film) is formed on a substrate such as a silicon wafer, a groove pattern for a metal wiring is formed on the interlayer film (insulating film), a barrier metal layer of tantalum nitride (TaN) or the like is formed by a sputtering method or the like, as necessary, and then a copper film for a metal wiring is formed by a chemical vapor deposition (CVD) method or the like. Here, when a barrier metal layer of TaN or the like is provided, the barrier metal layer can prevent, for example, lowering of the insulation properties of the interlayer insulating film in association with the diffusion of copper or an impurity or the like to the interlayer insulating film and erosion of the interlayer insulating film, and can enhance the adhesion between the interlayer insulating film and copper.

Subsequently, a film of unnecessary copper and barrier metal (occasionally referred to as "sacrifice layer") formed on a portion out of the groove is removed by polishing with a chemical-mechanical polishing (CMP) method and the upper surface is flattened to the maximum extent possible, and thus a wiring/circuit pattern of copper is formed by leaving a metal film only in the groove.

The abrasive used in the CMP method is typically composed of: a spherical polishing particle consisting of a metal oxide such as silica and alumina, and having an average particle diameter of about 5 to 300 nm; an oxidant for increasing the polishing rate of a wiring/circuit metal; an additive such as organic acid; and a solvent such as pure water.

Polishing with a conventional polishing particle such as silica, alumina, or the like had a disadvantage that scratches (scars) are observed on the surface of a polished object after polishing, or that scratches are additionally generated by a remaining polishing particle. In this regard, disclosed is an organic-inorganic composite particle as a polishing particle for preventing generation of scratches, which includes an organic polymer backbone and a polysiloxane backbone having, in the molecule, an organic silicon as a silicon atom directly chemically bonding to at least one carbon atom in the organic polymer backbone, wherein the content of $SiO_2$ constituting the polysiloxane backbone is 25% by weight or more (e.g., see Japanese Patent Laid-Open No. 9-324174).

Further disclosed is a polishing particle capable of suppressing generation of scratches, and polishing to flatten the surface of a substrate at a sufficient polishing rate, wherein the carbon content of alkoxy residues derived from alkoxide in the silica particle is 0.5 to 5% by weight, the 10% compressive elastic modulus is 500 to 3000 kgf/mm$^2$, and the Na content of the silica particle is 100 ppm or less as Na (see Japanese Patent Laid-Open No. 2003-213249).

Furthermore disclosed are: a silica polishing particle with a small content of impurity components, wherein the average secondary particle diameter is 20 to 1000 nm, the silica concentration is 10 to 50% by weight, and the metal impurity content is 1 ppm or less (see Japanese Patent Laid-Open No. 2005-060217); and a polishing particle, wherein the CV value is 20 or less, and the content of sodium, an alkali earth metal selected from calcium and magnesium, a heavy metal selected from iron, titanium, nickel, chromium, copper, zinc, lead, silver, manganese, and cobalt, and anions other than hydroxy anions is 1% by weight or less, respectively (see Japanese Patent Laid-Open No. 2013-082584).

PRIOR ART DOCUMENTS

1. Japanese Patent Laid-Open No. 9-324174
2. Japanese Patent Laid-Open No. 2003-213249
3. Japanese Patent Laid-Open No. 2005-060217
4. Japanese Patent Laid-Open No. 2013-082584

However, the organic-inorganic composite particle disclosed in Japanese Patent Laid-Open No. 9-324174 has different particle hardness depending on the content of $SiO_2$ in the polysiloxane backbone, and provides a lower polishing rate, although fewer scratches are generated, when the organic polymer content is high and the $SiO_2$ content is low. On the contrary, when the organic polymer content is low and the $SiO_2$ content is high, scratches are likely to be generated, although a higher polishing rate is provided. However, even when the $SiO_2$ content is set high in a manner such that scratches are not generated, a sufficient polishing rate cannot be achieved, which is a significant disadvantage.

In the case of Japanese Patent Laid-Open No. 2003-213249, an abrasive with a relatively high polishing rate and high surface accuracy (low profile irregularity) can be obtained. However, there is a disadvantage that the abrasive grain (silica polishing particle) remain attached to a substrate after polishing and it is difficult to wash them out, resulting in a state in which particles are attached to the substrate (a state in which what is called "particle residues" due to particle attachment is present). Although the reason for the attachment is not clear, the attachment is presumably because the abrasive grain has excessive —OR groups (alkoxy groups) and hence the alkoxy residues are hydrolyzed by an acid or alkali added during the preparation of a polishing slurry (abrasive) to generate active —OH groups, and the active —OH groups strengthen the interaction with a substrate.

In the case of Japanese Patent Laid-Open No. 2005-060217 and Japanese Patent Laid-Open No. 2013-082584, since silicon alkoxide, the raw material, is highly pure per se, no problem arises even when an alcohol or a catalyst is directly used for conventional electronic devices. However, a further reduction in the metal impurity content is required as higher integration and higher density are provided to semiconductor integrated circuits.

An object of the present invention is to provide a silica-based polishing particle, particularly suitable for primary polishing, which provides a high polishing rate on the surface of a substrate and which prevents particle residues on the substrate after polishing, and an abrasive comprising the silica-based polishing particle.

SUMMARY OF THE INVENTION

The silica-based polishing particle according to the present invention is a silica-based particle with a three-dimensional polycondensation structure containing an alkoxy group, wherein the particle has an average particle diameter (d) of 5 to 300 nm, an aspect ratio of more than 1.20 and 5.00 or less, and a carbon content of 0.005% by mass or more and less than 0.50% by mass. The silica-based polishing particle according to the present invention has a high hardness and does not have a true spherical shape but has an "irregular shape," resulting in a higher polishing rate in polishing, and as it has a small number of alkoxy groups, fewer "particle residues" are left on the substrate.

It is preferred that, in the silica-based particle, the content of each of alkali metals, alkali earth metals, Fe, Ti, Zn, Pd, Ag, Mn, Co, Mo, Sn, Al, and Zr is within the range of less than 0.1 ppm, the content of each of Cu, Ni, and Cr is within the range of less than 1 ppb, and the content of each of U and Th is within the range of less than 0.3 ppb. By being within this range, the silica-based particle can be used as an abrasive grain for highly integrated logics and memories with a wiring node of 40 nm or less, and for three-dimensional implementation.

In addition, it is preferred that, in the silica-based particle, the ratio ($\gamma$/b) of the dynamic light scattering particle diameter ($\gamma$) to the average major axis diameter (b) is 0.70 or more and 3.00 or less. At a ratio ($\gamma$/b) within this range, the silica-based particles are in a state not being aggregated, and advantageously provide a high polishing rate in polishing, even though the elasticity of the particles is poor, and provide improved smoothness with fewer "particle residues" left on the substrate.

Further, it is preferred that the ratio ($\gamma^1$/d) of the equivalent spherical particle diameter ($\gamma^1$) calculated from the specific surface area in accordance with a BET method to the average particle diameter (d) is 0.80 or more and less than 1.00. At a ratio ($\gamma^1$/d) within this range, the silica-based particles comprise porous particles, and thus the particles are not hard even though the elasticity of the particles themselves is poor, and can provide improved smoothness.

The abrasive according to the present invention is characterized by including the silica-based particle, and preferably used in primary polishing.

The abrasive according to the present invention may further include a silica-based particle with a three-dimensional polycondensation structure containing an alkoxy group, the particle having an average particle diameter (d) of 5 to 300 nm, an aspect ratio of 1.00 or more and 1.20 or less, and a carbon content of 0.005% by mass or more and less than 0.50% by mass.

The silica-based polishing particle and the abrasive including the silica-based polishing particle according to the present invention can provide a high polishing rate and further prevent particle residues on the substrate after polishing. Therefore, the silica-based polishing particle and the abrasive including the silica-based polishing particle according to the present invention are particularly useful in primary polishing (rough polishing).

DETAILED DESCRIPTION OF THE PREFERRED EMBODIMENTS

<Polishing Particle>

Figure 1:
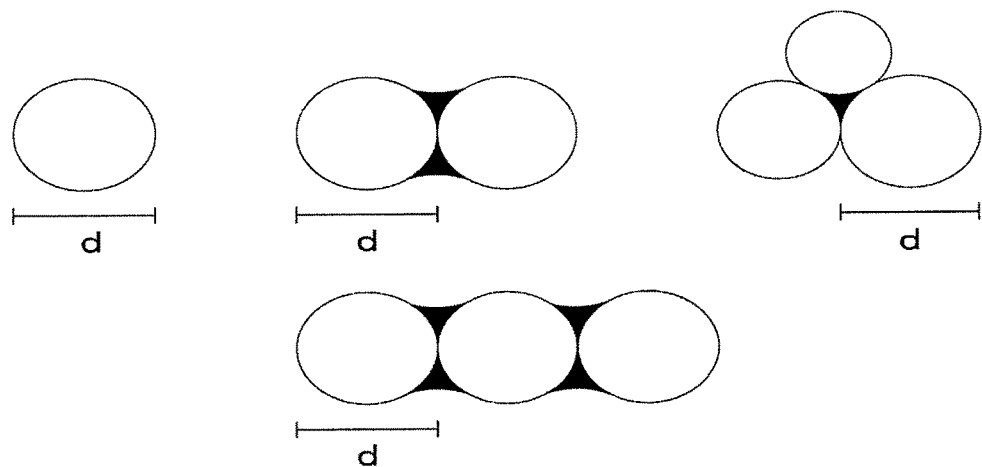
FIG. 1 shows diagrams illustrating a method for calculating the average particle diameter (d) in the present invention, wherein each solid black area represents an interparticle junction part, and each interparticle junction part may include a space.

The average particle diameter (d) of the silica-based polishing particle according to the present invention is 5 to 300 nm, and can be appropriately set in accordance with a required polishing rate, polishing precision, and so on. The average particle diameter (d) is determined as follows: an electron micrograph is taken and 100 particles are arbitrarily selected therefrom; the longest diameter of the primary particle(s) is measured for each of the 100 particles as illustrated in FIG. 1; and the average value is used as the average particle diameter (d).

When the average particle diameter is smaller than 5 nm, a dispersion of the silica-based particle tends to have insufficient stability, and the particle diameter is too small to achieve a sufficient polishing rate. In addition, since the surface area is large, "particle residues" are likely to be left on a substrate after polishing. When the average particle diameter is larger than 300 nm, scratches are likely to be generated, and may cause insufficient smoothness, although depending on the types of substrate or insulating film. The average particle diameter is preferably 10 to 200 nm, and more preferably 15 to 100 nm.

The aspect ratio of the silica-based polishing particle according to the present invention is more than 1.20 and 5.00 or less.

Figure 2:
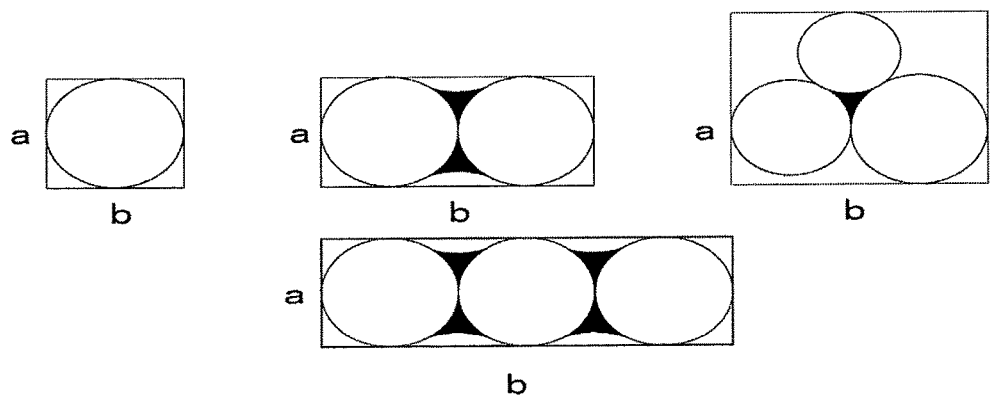
FIG. 2 shows diagrams illustrating a method for calculating the aspect ratio (b/a; provided that b≥a) and the average major axis diameter (b) in the present invention, wherein a represents a minor axis diameter and b represents a major axis diameter, each solid black area represents an interparticle junction part, and each interparticle junction part may include a space.

The aspect ratio is determined as follows: particles are observed under a scanning electron microscope; the longest side of a rectangle enclosing a particle or particles is defined as the side b as illustrated in FIG. 2 and the vertical-to-horizontal ratio is measured for 100 particles; and the average value is used as the aspect ratio. A particle with an aspect ratio within the above range does not have a true spherical shape but has an "irregular shape." In addition, a convex portion is present in the surface of a particle with an aspect ratio within the above range, and as a result, stress is concentrated thereto in polishing, resulting in a higher polishing rate in polishing the substrate. Thus, the silica polishing particle according to the present invention is particularly suitable as an abrasive grain for primary polishing.

Here, a particle with an aspect ratio of 1.00 or more and 1.20 or less has a true spherical shape or a generally spherical shape, and thus, may not provide a sufficient polishing rate particularly in primary polishing.

On the other hand, when the aspect ratio is more than 5.00, the particles are often likely to aggregate excessively or have an extremely irregular or rectangular shape, and uniform polishing cannot be achieved, and scratches may be generated. Thus, the particle is not suitable as a polishing particle.

The primary particles of the silica-based polishing particle according to the present invention form a three-dimensional polycondensation structure. This is due to the fact that hydrolysis and polycondensation of alkoxysilane occurring in an alkaline environment proceed not only in a planar state (in a two-dimensional manner) but also in a cubic manner (in a three-dimensional manner). An abrasive using a particle having such a structure is suitable because it has a high particle dispersibility and provides a sufficient polishing rate. On the other hand, hydrolysis and polycondensation of alkoxysilane occurring in an acidic environment proceed in a two-dimensional manner, and hence a spherical particle cannot be obtained.

The structure can be determined by the presence of a particle observed with a transmission electron microscope or a scanning electron microscope.

The silica-based polishing particle according to the present invention is a silica-based particle containing an alkoxy group. The content of carbon derived from the alkoxy group in the silica-based polishing particle is 0.005% by mass or more and less than 0.50% by mass. When the carbon content is within this range, when using an abrasive using a silica-based polishing particle, it can provide a substrate with less particle attachment and from which the particles can be easily washed out (with fewer "particle residues").

Although this mechanism has not yet been identified, the reason why "particle residues" were frequently observed in conventional polishing is probably that due to the addition of an acid or alkali during the preparation of a polishing slurry (abrasive), excessive alkoxy residues in a silica-based polishing particle hydrolyze as described above, resulting in increased formation of active —OH groups. In the case of the present invention, in contrast, the carbon content of the silica-based polishing particle is within the range of 0.005% by mass or more and less than 0.50% by mass, and the amount of formation of —OH groups by hydrolysis of alkoxy residues is quite small, which weakens the interaction with a substrate and thus a substrate with a smaller amount of particle attachment (fewer "particle residues") can be obtained.

Here, when the carbon content is 0.50% by mass or more, a sufficient polishing rate cannot be achieved because the number of alkoxy residues increases, and more particle attachment is caused after polishing. Thus, such a carbon content is not preferred.

When the carbon content is less than 0.005% by mass, on the other hand, the number of alkoxy residues as carbon source is small, and formation of siloxane bond proceeds. As a result, the particle becomes very hard and provides a high polishing rate. However, scratches are generated to result in a polished surface with insufficient smoothness, even if the other conditions are adjusted. In addition, the stability in mixing the silica-based particle with other materials is lowered, which causes aggregation in formation of a polishing slurry and scratches may be generated in polishing. As such, further reduction in the carbon content to below 0.005% by mass to raise the purity of the silica-based particle may result in insufficient performance as an abrasive.

The carbon content is more preferably 0.01% by mass or more and less than 0.30% by mass, and even more preferably 0.01% by mass or more and less than 0.20% by mass.

It is preferred that, in the silica-based polishing particle according to the present invention, the content of each of alkali metals, alkali earth metals, Fe, Ti, Zn, Pd, Ag, Mn, Co, Mo, Sn, Al, and Zr is less than 0.1 ppm, the content of each of Cu, Ni, and Cr is less than 1 ppb, and the content of each of U and Th is less than 0.3 ppb.

When the metal elements as impurity components are present in quantities larger than the above-mentioned ranges, the metal elements may remain on a substrate polished with the silica-based particle, and cause insulation failure to a circuit formed on a semiconductor substrate or short the circuit to decrease the dielectric constant of a film for insulation (insulating film) and increase the impedance of the metal wiring, leading to lowering of the response speed, increase of the power consumption, and so on. In addition, when the metal element ions migrate (diffuse), and the conditions for use become severe or after a long-time use, the above-mentioned failures may be caused. In particular, U and Th generate radiation to cause malfunctions to a semiconductor device even when the amount of remaining U or Th is minute. Thus, the U or Th content higher than the above range is not preferred.

Here, the alkali metal refers to Li, Na, K, Rb, Cs, or Fr. The alkali earth metal refers to Be, Mg, Ca, Sr, Ba, or Ra.

To obtain such a highly-pure silica-based particle with a small content of impurity components, it is preferred to use an apparatus the material of which is free of such elements and has high chemical resistance in preparation of the particle. Specific preferred examples of the material include plastics such as Teflon (R), FRP, and carbon fibers, and non-alkali glass.

In addition, it is preferred to purify raw materials to be used by distillation, ion exchange, or removal with a filter. In particular, alcohol used in hydrolysis of alkoxide, may be contaminated with metal impurity components from a tank and so on or with a catalyst during synthesis, and may require purification at a particularly high level.

As a method to obtain a highly-pure silica-based particle, it is possible to provide raw materials with a small content of impurity components in advance, or preventing contamination from an apparatus for particle preparation, as described above. As another method, it is possible to reduce impurity components for a particle prepared without taking such countermeasures sufficiently. However, as impurity components are incorporated in the silica particle, purification using ion exchange or removal with a filter would be inefficient, and high cost may be required. Thus, use of such a method is not practical for obtaining a silica-based particle with a small content of impurity components.

It is preferred that, in the silica-based polishing particle according to the present invention, the ratio ($\gamma/b$) of the dynamic light scattering particle diameter ($\gamma$) to the average major axis diameter (b) is 0.70 or more and 3.00 or less. The average particle diameter measured in accordance with a dynamic light scattering method, namely, the dynamic light scattering particle diameter ($\gamma$) can be determined by using a measuring apparatus the principle of measurement of which is based on a dynamic light scattering method. The dynamic light scattering particle diameter ($\gamma$) is determined by calculation based on information of both minor axis diameter "a" and major axis diameter "b" of the particle subjected to Brownian motion. Thus, when the aspect ratio is more than 1.20 and 5.00 or less, the determined dynamic light scattering particle diameter ($\gamma$) may be smaller than the average major axis diameter (b) due to the influence of the Brownian motion depending on the state of the sample. However, silica-based particles with a ratio ($\gamma/b$) within this range have a small degree of aggregation, and hence advantageously provide a high polishing rate in polishing and improved smoothness and leave fewer "particle residues" on a substrate.

The average major axis diameter (b) is determined by observing 100 particles under a scanning electron microscope, measuring their major axis diameter (b) (see FIG. 2) and obtaining the average of the measured values.

It is preferred that, in the silica-based polishing particle according to the present invention, the ratio ($\gamma^1/d$) of the equivalent spherical particle diameter ($\gamma^1$) calculated from the specific surface area (SA) in accordance with a nitrogen adsorption method (BET method) to the average particle diameter (d) is 0.80 or more and less than 1.00. Determination of the equivalent spherical particle diameter ($\gamma^1$) by using a BET method is as follows: the specific surface area is calculated from the amount of adsorption of nitrogen by using a BET single-point method; and the equivalent spherical particle diameter ($\gamma^1$) is calculated with the density of silica defined as 2.2 by using the equation "equivalent spherical particle diameter ($\gamma^1$)=6000/(SA×density)."

When the ratio ($\gamma^1$/d) is within the above range, the equivalent spherical particle diameter ($\gamma^1$) is smaller than the apparent particle size (average particle diameter, d), and hence the particle is porous. Accordingly, the particle is not hard even though the elasticity of the particle itself is poor, and can thus provide improved smoothness.

A ratio ($\gamma^1$/d) of 1.00 indicates that the inside of the particle is filled (solid), and it may be difficult to obtain a substrate with high smoothness in polishing when the elasticity of the particle itself is poor. When the ratio ($\gamma^1$/d) is less than 0.80, the particle is hollow and fragile, which may result in insufficient polishing.

As described above, the silica-based polishing particle according to the present invention is useful in primary polishing or the like. The primary polishing is preferably followed by final polishing (secondary polishing) with final-polishing particles. The silica-based polishing particles according to the present invention and the final-polishing particles may be also used as a mixture thereof. Preferred examples of the final-polishing particle include a silica-based particle with a three-dimensional polycondensation structure containing an alkoxy group, the particle having an average particle diameter (d) of 5 to 300 nm, an aspect ratio of 1.00 or more and 1.20 or less, and a carbon content of 0.005% by mass or more and less than 0.50% by mass. Such a particle, which is a particle proposed by the present inventors in Japanese Patent Application No. 2016-216956, provides a higher polishing rate in polishing by virtue of the high hardness, and provides higher smoothness in polishing by virtue of less particle aggregation in the preparation of a slurry and high dispersibility due to the generally spherical shape, and leaves fewer "particle residues" on a substrate by virtue of the smaller number of alkoxy groups in the particle. Thus, four requirements for an abrasive, namely, the polishing rate, smoothness, prevention of generation of scratches, and prevention of generation of particle residues, can be simultaneously satisfied.

An embodiment of the present invention includes a combination of abrasives which comprises the abrasive comprising the above-described silica-based polishing particle according to the present invention and the abrasive comprising a silica-based particle (final-polishing particle) with a three-dimensional polycondensation structure containing an alkoxy group, the particle having an average particle diameter (d) of 5 to 300 nm, an aspect ratio of 1.00 or more and 1.20 or less, and a carbon content of 0.005% by mass or more and less than 0.50% by mass. More specifically, embodiments of the present invention include a combination of the abrasive for primary polishing and the abrasive for secondary polishing so as to perform polishing by using the abrasive including the silica-based polishing particle according to the present invention and then using the abrasive including the final-polishing particle, as described above, and a combination of both of the abrasives so as to perform polishing by using a mixture thereof.

When using both of the abrasives as a mixture thereof, the mass proportion of the final-polishing particles in the mixture of both abrasives is preferably 0.1 to 70%, and more preferably 1 to 10%. When the mass proportion exceeds 70%, the polishing rate is reduced and a high polishing rate which primary polishing is intended to achieve may not be obtained. When the mass proportion is less than 0.1%, the polishing rate does not become higher even though the final-polishing particles are mixed. When the mass proportion is within the range of 1 to 10%, it is possible to provide higher smoothness and extremely higher polishing rate than when using primary polishing particles alone. Although the reason for the higher polishing rate is not clear, it is considered that the rotation speed of the silica-based particles between the polishing pad and the substrate in polishing becomes higher than when using primary polishing particles alone, due to the presence of spherical particles having a low aspect ratio to provide a gear effect, thus increasing the polishing rate.

Therefore, the ratio of an average particle diameter of final-polishing particle to an average particle diameter of the silica-based polishing particle according to the present invention (a particle diameter of the final-polishing particle/a particle diameter of the silica-based polishing particle according to the present invention) is preferably 0.01 to 1, and more preferably 0.05 to 0.85.

The final-polishing particles suitable for the final polishing preferably have the following characteristics:

(1) the content of each of alkali metals, alkali earth metals, Fe, Ti, Zn, Pd, Ag, Mn, Co, Mo, Sn, Al, and Zr is less than 0.1 ppm, the content of each of Cu, Ni, and Cr is less than 1 ppb, and the content of each of U and Th is less than 0.3 ppb;

(2) the ratio ($\gamma$/d) of a dynamic light scattering particle diameter ($\gamma$) to an average particle diameter (d) is 1.00 or more and 1.50 or less; and (3) the ratio ($\gamma^1$/d) of an equivalent spherical particle diameter ($\gamma^1$) calculated from a specific surface area (SA) in accordance with a BET method to the average particle diameter (d) is 0.80 or more and less than 1.00.

<Production of Silica-Based Polishing Particle>

The method for producing the silica-based polishing particle according to the present invention is not particularly limited as long as the above-described particle can be obtained.

As a method for reducing the content of impurity components such as alkali metals or the content of carbon component derived from the alkoxy residue, the silica particle disclosed in Japanese Patent Laid-Open No. 2003-213249 in which the carbon content of alkoxy residues derived from alkoxide is 0.5 to 5% by mass can be subjected to ultrafiltration membrane treatment or the like to remove unreacted alkoxysilane and further washed to reduce the carbon content derived from the alkoxy group; or the dispersion of the silica particle can be further subjected to hydrothermal treatment under alkaline conditions (pH 9 to 11) with an autoclave or the like; or the silica particle can be calcined and crushed. These methods can be also used in combination.

Specific methods for producing the silica-based polishing particle are exemplified in the following. Examples of the method for producing the silica-based polishing particle according to the present invention generally include the following two methods: 1) a production method in which alkoxysilane is subjected to hydrolysis to obtain a particle having a true spherical shape or a generally spherical shape followed by hydrothermal treatment or the like under acidic to weakly alkaline conditions (pH 8 or lower) to attach the particles each other, resulting in a particle having an aspect ratio of more than 1.20 and 5.00 or less (Production Method 1); and 2) a production method in which alkoxysilane is subjected to hydrolysis to obtain a particle having an aspect ratio of more than 1.20 and 5.00 or less (Production Method 2).

<Production of Silica-Based Polishing Particle: Production Method 1>

First, Production Method 1, that is, 1) a production method in which alkoxysilane is subjected to hydrolysis to obtain a particle having a true spherical shape or a generally spherical shape followed by hydrothermal treatment or the like under acidic to weakly alkaline conditions (pH 8 or lower) to attach the particles each other, resulting in a particle having an aspect ratio of more than 1.20 and 5.00 or less, will be described.

The particle having a true spherical shape or a generally spherical shape can be obtained by hydrolysis of one or more of the alkoxysilanes represented by the following formula [1].

$$X_n Si(OR)_{4-n} \quad [1]$$

In the formula, X represents a hydrogen atom, a fluorine atom, an alkyl group having 1 to 8 carbon atoms, an aryl group, or a vinyl group; R represents a hydrogen atom, an alkyl group having 1 to 8 carbon atoms, an aryl group, or a vinyl group; and n is an integer of 0 to 3.

Among these alkoxysilanes, use of an alkoxysilane with short alkyl chains such as tetramethoxysilane (TMOS) and tetraethoxysilane (TEOS) is particularly preferred. This is because the hydrolysis rate is high when the alkoxysilane is used, and a silica particle with a small carbon content can be easily obtained. More preferred is tetramethoxysilane (TMOS) having a short alkyl chain.

Hydrolysis of alkoxysilane is performed in the presence of water, an organic solvent, and a catalyst. The amount of water required for this hydrolysis is desirably more than 4 mol and 50 mol or less, preferably more than 4 mol and 25 mol or less, per mol of alkoxy group (—OR group) constituting the alkoxysilane. When the amount of water is within this range, a particle having an aspect ratio of 1.00 or more and 1.20 or less is likely to be obtained.

It is desirable to add a catalyst such as to be 0.005 to 1 mol, preferably 0.01 to 0.8 mol, per mol of alkoxysilane. When the quantity of the catalyst is less than 0.005 mol per mol of alkoxysilane, the progression of hydrolysis is slow, and a particle having a wide particle size distribution may be formed. When the quantity of the catalyst is over 1 mol per mol of alkoxysilane, the hydrolysis speed is significantly high, and thus it is difficult to obtain a particle, and a gel may be formed.

Examples of the organic solvent include alcohols, ketones, ethers, and esters. More specifically, alcohols such as methanol, ethanol, propanol, and butanol, ketones such as methyl ethyl ketone and methyl isobutyl ketone, glycol ethers such as methyl cellosolve, ethyl cellosolve, and propylene glycol monopropyl ether, glycols such as ethylene glycol, propylene glycol, and hexylene glycol, or esters such as methyl acetate, ethyl acetate, methyl lactate, and ethyl lactate are used.

For the catalyst, a basic compound is used, such as ammonia, an amine, an alkali metal hydride, a quaternary ammonium compound, and an amine coupling agent. Although an alkali metal hydride can be used as the catalyst, an alkali metal hydride accelerates hydrolysis of the alkoxy group in the alkoxysilane to reduce the number of alkoxy groups (carbon) remaining in the resulting particle, and hence scratches may be generated, even though a high polishing rate is achieved, and, in addition, a content of alkali metal elements may increase.

Examples of the alkoxysilane represented by the formula [1] other than tetramethoxysilane and tetraethoxysilane include tetraisopropoxysilane, tetrabutoxysilane, tetoraoctoxysilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trifluoromethyltrimethoxysilane, and trifluoromethyltriethoxysilane.

Hydrolysis of the alkoxysilane is typically performed under normal pressure at a temperature equal to or lower than the boiling point of a solvent to be used, preferably at a temperature lower than the boiling point of a solvent to be used by about 5 to 10° C. In case that a heat/pressure-resistant container such as an autoclave is used, hydrolysis can be performed at a temperature higher than the above-mentioned temperature.

When hydrolysis is performed under the above conditions, polycondensation of the alkoxysilane proceeds in a three-dimensional manner and a particle having an average particle diameter of 5 to 300 nm and an aspect ratio of 1.00 or more and 1.20 or less is thus likely to be obtained.

The silica-based particle produced by hydrolysis as described above can be subjected to (1) preferably washing, and (2) hydrothermal treatment under acidic to weakly alkaline conditions (pH 8 or lower) at a temperature of 300° C. or lower to remove impurities, to afford the silica polishing particle according to the present invention. As necessary, the resulting silica-based polishing particle can be further subjected to calcination followed by crushing. The carbon content can be reduced to a desired carbon content by performing any one of these treatments or any combination of these treatments. Removal of the carbon component is easier for silane alkoxide having a structure of shorter carbon chains, and tetramethoxysilane and tetraethoxysilane are preferred among the above silane alkoxides. In particular, in the case of tetramethoxysilane having the shortest carbon chain, the carbon component can be removed by simple washing with water.

First, (1) washing in the above process will be described. In Production Method 1, the washing is optional, but it is preferred to perform washing.

The washing agent to be used in the washing can be any washing agent capable of dissolving the alkoxysilane therein, preferably pure water and an alcohol, more preferably an alcohol, and especially preferably methanol and ethanol. Since alkoxide has high solubility in alcohols, even unreacted alkoxide inside of the particle can be removed through washing with an alcohol, although depending on washing conditions.

For this reason, use of an alcohol makes it easy to obtain a silica-based polishing particle in which the ratio ($\gamma^1/d$) of the equivalent spherical particle diameter ($\gamma^1$) calculated from the specific surface area (SA) in accordance with a BET method to the average particle diameter (d) is 0.80 or more and less than 1.00. When washing is performed with water, in which alkoxide has a low solubility, on the other hand, alkoxide on the surface of the particle is easily washed out, and thus a silica-based polishing particle in which the ratio ($\gamma^1/d$) is 1.00 is likely to be formed. In addition, washing with water may result in a large ratio ($\gamma^1/d$) for some unclear reason. Although the reason has not been identified yet, it is estimated that the amount of alkoxide on the surface of the particle has some influence.

The washing with an alcohol is preferably washing with an ultrafiltration membrane or ceramic membrane. The amount of pure water or an alcohol for washing is preferably 4 to 100 times the amount of the dispersion, and more preferably 8 to 100 times the amount of the dispersion, depending on the concentration of the dispersion of the silica-based particle. The amount of pure water or an alcohol for washing which is less than four times the amount of the dispersion is suitable for removing unreacted alkoxysilane as disclosed in Japanese Patent Laid-Open Nos. 9-324174 and 2003-213249, but the content of carbon derived from an alkoxide group on the surface or in the inside of the particle is difficult to be reduced. On the other hand, the amount of pure water or an alcohol for washing which is more than 100 times the amount of the dispersion does not reduce the carbon content and is economically inefficient.

The washed particle is subjected to replacement with water by using an ultrafiltration membrane or a rotary evaporator to adjust the concentration of the silica-based particle to 1 to 5% by mass.

Then, (2) hydrothermal treatment under acidic to weakly alkaline conditions (pH 8 or lower) at a temperature of 300° C. or lower will be described. This treatment is a treatment essential for Production Method 1.

The dispersion having a concentration of 1 to 5% by mass of the silica-based particle with an aspect ratio of 1.20 or less obtained after washing is subjected to hydrothermal treatment in an acidic environment (under acidic to weakly alkaline conditions, that is, pH 8 or lower) to afford a particle with an aspect ratio of 1.20 to 5.00 in which two or more particles are linked. This is probably due to the low solubility of the silica under acidic conditions (under acidic to weakly alkaline conditions, that is, pH 8 or lower) resulting in non-uniform Ostwald ripening. The pH is preferably 3 to 7. When the pH is outside this range, aggregation may be caused such that the ratio (γ/b) of the dynamic light scattering particle diameter (γ) to the average major axis diameter (b) exceeds 3.00. Use of such a short fiber-shaped silica-based particle or aggregated silica-based particle as an abrasive is not preferred because scratches may be generated.

The temperature of the hydrothermal treatment is preferably 100 to 300° C., and more preferably 100 to 250° C.

When the temperature in the hydrothermal treatment is low and the pH is low, the carbon content is high and a highly porous silica-based particle is likely to be formed. Hence, the ratio ($γ^1/d$) of the equivalent spherical particle diameter ($γ^1$) calculated from the specific surface area (SA) in accordance with a BET method to the average particle diameter (d) is likely to become lower.

The particle subjected to the hydrothermal treatment is purified with an ion exchange resin, and subjected to replacement with water followed by concentration by using an ultrafiltration membrane or a rotary evaporator to afford a silica-based polishing particle.

In case where the resulting silica-based polishing particle is subjected to calcination and crushing, the calcination temperature is preferably 200° C. to 600° C. When the calcination temperature is lower than 200° C., unreacted alkoxide does not react, and a particle having a carbon content of 0.50% by mass or more may be formed. When the calcination temperature is higher than 600° C., in contrast, alkoxide is decomposed, and a particle having a carbon content of less than 0.005% by mass may be formed. Even when a particle having a carbon content of 0.005% by mass or more is obtained at this calcination temperature, inter-particle attachment may be caused to prevent formation of a spherical particle even after crushing. A conventionally known crushing method can be used for crushing, and a crushing method with a bead mill is preferred.

<Production of Silica-Based Polishing Particle: Production Method 2>

Then, Production Method 2, that is, 2) a production method in which alkoxysilane is subjected to hydrolysis to obtain a particle having an aspect ratio of more than 1.20 and 5.00 or less will be described.

The particle having an aspect ratio of more than 1.20 and 5.00 or less can be obtained by hydrolysis of one or more of the alkoxysilanes represented by the following formula [1].

$$X_n Si(OR)_{4-n} \qquad [1]$$

In the formula, X represents a hydrogen atom, a fluorine atom, an alkyl group having 1 to 8 carbon atoms, an aryl group, or a vinyl group; R represents a hydrogen atom, an alkyl group having 1 to 8 carbon atoms, an aryl group, or a vinyl group; and n is an integer of 0 to 3.

Among these alkoxysilanes, use of an alkoxysilane with short alkyl chains such as tetramethoxysilane (TMOS) and tetraethoxysilane (TEOS) is particularly preferred. This is because the hydrolysis rate is high when the alkoxysilane is used, and a silica particle with a small carbon content can be easily obtained.

Hydrolysis of alkoxysilane is performed in the presence of water, an organic solvent, and a catalyst. It is desirable that the amount of water required for this hydrolysis is 0.1 mol to 4 mol, preferably 0.2 mol to 2 mol, per mol of alkoxy group (—OR group) constituting the alkoxysilane. When the amount of water is within this range, a particle having an aspect ratio of more than 1.20 and 5.00 or less is likely to be obtained. When the amount of water per mol of alkoxy group constituting the alkoxysilane is less than 0.1 mol, hydrolysis itself does not proceed, unreacted alkoxysilane remains and the resulting particle may be aggregated or the like. When the amount of water per mol of alkoxy group constituting the alkoxysilane exceeds 4 mol, a spherical particle or a particle having an aspect ratio of 1.00 to 1.20 is likely to be obtained.

It is desirable to add a catalyst in a quantity of 0.005 to 1 mol, preferably 0.01 to 0.8 mol, per mol of alkoxysilane. When the quantity of the catalyst is less than 0.005 mol per mol of alkoxysilane, the progression of hydrolysis is slow, and a particle having a wide particle size distribution may be formed. When the quantity of the catalyst is over 1 mol per mol of alkoxysilane, the hydrolysis speed is significantly high, and thus it is difficult to obtain a particle, and a gel-like substance may be formed.

Examples of the organic solvent include alcohols, ketones, ethers, and esters. More specifically, alcohols such as methanol, ethanol, propanol, and butanol, ketones such as methyl ethyl ketone and methyl isobutyl ketone, glycol ethers such as methyl cellosolve, ethyl cellosolve, and propylene glycol monopropyl ether, glycols such as ethylene glycol, propylene glycol, and hexylene glycol, or esters such as methyl acetate, ethyl acetate, methyl lactate, and ethyl lactate are used.

For the catalyst, a basic compound is used, such as ammonia, an amine, an alkali metal hydride, a quaternary ammonium compound, and an amine coupling agent. Although an alkali metal hydride can be used as the catalyst, an alkali metal hydride accelerates hydrolysis of the alkoxy group in the alkoxysilane to reduce the number of alkoxy groups (carbon) remaining in the resulting particle, and hence scratches may be generated, even though a high polishing rate is achieved, and, in addition, a content of alkali metal elements may increase.

Examples of the alkoxysilane represented by the formula [1] other than tetramethoxysilane and tetraethoxysilane include tetraisopropoxysilane, tetrabutoxysilane, tetoraoctoxysilane, methyltrimethoxysilane, methyltriethoxysilane, methyltriisopropoxysilane, ethyltrimethoxysilane, ethyltriethoxysilane, ethyltriisopropoxysilane, octyltrimethoxysilane, octyltriethoxysilane, vinyltrimethoxysilane, vinyltriethoxysilane, phenyltrimethoxysilane, phenyltriethoxysilane, trimethoxysilane, triethoxysilane, triisopropoxysilane, fluorotrimethoxysilane, fluorotriethoxysilane, dimethyldimethoxysilane, dimethyldiethoxysilane, diethyldimethoxysilane, diethyldiethoxysilane, dimethoxysilane, diethoxysilane, difluorodimethoxysilane, difluorodiethoxysilane, trifluoromethyltrimethoxysilane, and trifluoromethyltriethoxysilane.

Hydrolysis of the alkoxysilane is typically performed under normal pressure at a temperature equal to or lower than the boiling point of a solvent to be used, preferably at a temperature lower than the boiling point of a solvent to be used by about 5 to 10° C. In case that a heat/pressure-resistant container such as an autoclave is used, hydrolysis can be performed at a temperature higher than the above-mentioned temperature.

When hydrolysis is performed under the above conditions, polycondensation of the alkoxysilane proceeds in a three-dimensional manner and a silica-based polishing particle having an average particle diameter of 5 to 300 nm and an aspect ratio of more than 1.20 and 5.00 or less can be obtained.

By subjecting the silica-based particle produced by hydrolysis as described above to at least one of (1) washing, and (2) hydrothermal treatment under alkaline conditions (pH 9 to 11) at a temperature of 300° C. or lower to remove impurities, the silica polishing particle according to the present invention can be obtained. As necessary, the resulting silica-based polishing particle can be further subjected to calcination followed by crushing. The carbon content can be reduced to a desired carbon content by performing any one of these treatments or any combination of these treatments. Removal of the carbon component is easier for silane alkoxide having a structure of shorter carbon chains, and tetramethoxysilane and tetraethoxysilane are preferred among the above silane alkoxides. In particular, in the case of tetramethoxysilane, having the shortest carbon chain, the carbon component can be removed by simple washing with water.

Washing and calcination/crushing may be performed as described in the above Production Method 1.

Next, (2) hydrothermal treatment under alkaline conditions (pH 9 to 11) at a temperature of 300° C. or lower will be described.

The hydrothermal treatment can accelerate hydrolysis of the alkoxide group in the silica-based particle to further reduce the carbon content, resulting in a dense particle. Under acidic conditions, hydrolysis may not be accelerated due to the low solubility of the silica, the carbon content cannot be reduced and the particle is difficult to become dense. Hence, the ratio ($\gamma^1/d$) of the equivalent spherical particle diameter ($\gamma^1$) calculated from the specific surface area (SA) in accordance with a BET method to the average particle diameter (d) is likely to become higher, that is, 0.9 to 1.00. Under preferred alkaline conditions, the pH is 9 to 11. The temperature in the hydrothermal treatment is preferably 300° C. or lower, more preferably 80 to 300° C., even more preferably 100 to 200° C., and most preferably 100 to 150° C.

Under conditions of pH of lower than 9 in the hydrothermal treatment, hydrolysis may not be accelerated due to the low solubility of the silica. When the pH in the hydrothermal treatment exceeds 11, the silica-based particle may dissolve due to the high solubility of the silica, and may thus become indeterminately shaped. When the temperature in the hydrothermal treatment is lower than 80° C., hydrolysis may not be accelerated due to the low temperature. When the temperature in the hydrothermal treatment exceeds 300° C., the silica-based particle may dissolve due to the high temperature resulting in the higher solubility of the silica, and may thus become indeterminately shaped.

As described above, when the hydrothermal treatment is performed under conditions which does not fall within the ranges of pH of 9 to 11 and the temperature of 300° C. or lower, the resulting particle becomes unstable and aggregation may be thus caused such that the ratio ($\gamma$/b) of the dynamic light scattering particle diameter ($\gamma$) to the average major axis diameter (b) exceeds 3.00. Use of such a short fiber-shaped silica-based particle or aggregated silica-based particle as an abrasive is not preferred because scratches may be generated.

The particle subjected to the hydrothermal treatment is purified with an ion exchange resin, and subjected to replacement with water followed by concentration by using an ultrafiltration membrane or a rotary evaporator to afford a silica-based polishing particle.

<Abrasive>

The abrasive according to the present invention is obtained by dispersing the above-described silica-based polishing particle in a dispersion medium.

Although water is typically used for the dispersion medium, alcohols such as methyl alcohol, ethyl alcohol, and isopropyl alcohol can be used, as necessary, and a water-soluble organic solvent such as ethers, esters, and ketones can be also used.

The concentration of the silica-based polishing particle in the abrasive is preferably 2 to 50% by mass, and more preferably 5 to 30% by mass. When the concentration is less than 2% by mass, the concentration is too low for some types of substrates or insulating films and a polishing rate decreases, which may disadvantageously lead to poor productivity. When the concentration of the silica-based particle is more than 50% by mass, the stability of the abrasive is insufficient, and further improvement in the polishing rate or polishing efficiency is not achieved. In addition, formation and attachment of a dried product may occur during a process of feeding a dispersion for polishing, which may cause generation of scratches.

The abrasive according to the present invention can be used with addition of conventionally known hydrogen peroxide, peracetic acid, urea peroxide, or a mixture thereof, as necessary, though the substance to be added depends on the type of an object to be polished. Use of the abrasive with addition of hydrogen peroxide or the like can effectively improve the polishing rate in the case that the object to be polished is made of metal.

In addition, the abrasive according to the present invention can be used with addition of an acid such as sulfuric acid, nitric acid, phosphoric acid, and hydrofluoric acid, or a sodium salt, potassium salt, or ammonium salt of any of these acids, or a mixture thereof, as necessary. In this case, when an object made of a plurality of materials is polished, the polishing rate is increased or decreased in accordance with the material being polished in the object, and thereby a flat polished surface can be finally obtained. As other additives, for example, polyvinyl alcohol, polyvinylpyrrolidone, imidazole, benzotriazole, or benzothiazole can be used so that a passive layer or a dissolution-preventing layer is formed on the surface of a metal object to be polished in order to prevent erosion of a substrate.

To spread the passive layer, a complexing agent can be used, such as an organic acid such as citric acid, lactic acid, acetic acid, oxalic acid, and phthalic acid, and a salt of any of these organic acids.

To improve the dispersibility and stability of a slurry of the abrasive, a cationic, anionic, nonionic, or amphoteric surfactant can be appropriately selected and added.

Further, to enhance the effects of the above additives, an acid or base can be added, as necessary, to control the pH of a slurry of the abrasive.

The silica-based polishing particle and the abrasive including the silica-based polishing particle according to the present invention provide a high polishing rate. The silica-based particle also leaves fewer "particle residues" on a substrate by virtue of the small carbon content, and is thus particularly useful in primary polishing. In addition, when the silica-based particle is substantially free of metal element components including sodium as impurity components, metal elements are not attached on the surface of a polished semiconductor substrate or oxide film, and hence the silica-based particle is particularly useful for flattening of a substrate, in particular, for formation of a metal wiring layer in a semiconductor integrated circuit, etc.

EXAMPLES

Hereinafter, the present invention will be described with reference to Examples. However, the present invention shall be not limited to these Examples.

Example 1

<Production of Silica-Based Polishing Particle (A)>

A mixed solvent of 139.1 g of pure water and 169.9 g of methanol (manufactured by Chusei Oil Co., Ltd. (the same applies hereinafter)) was held at 60° C., and thereto 2982.5 g of a water-methanol solution of tetraethoxysilane (manufactured by Tama Chemicals Co., Ltd., Ethyl Silicate 28, $SiO_2$=28% by mass (the same applies hereinafter)) (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3887.9 g. Thereafter, unreacted tetraethoxysilane, methanol, and ammonia were almost completely removed through an ultrafiltration membrane with 11663.7 g of pure water the weight of which corresponds to three times the weight of the aged product, the resultant was further washed through an ultrafiltration membrane with 38879 g of methanol the weight of which corresponds to ten times the weight of the aged product, and replacement with water was then performed with pure water by using an ultrafiltration membrane to adjust the concentration to 1% by mass. Thereafter, the pH was adjusted to 3.0 with hydrochloric acid, and aging was performed in an autoclave at 250° C. for 20 hours. Subsequently, the resultant was purified with an amphoteric ion exchange resin and then concentrated with an ultrafiltration membrane to afford a dispersion of a silica-based polishing particle (A) having a solid content concentration of 20% by mass.

The equipment used was lined with Teflon (R) (the same applies hereinafter). The tetraethoxysilane, methanol, and ammonia used had been subjected to distillation to reduce impurity components including sodium, which are listed in Table 2, to a concentration of less than 0.01 ppb (the same applies hereinafter). The average particle diameter, aspect ratio, average major axis diameter, dynamic light scattering particle diameter, equivalent spherical particle diameter, presence or absence of an alkoxy group, carbon content, and content of metal elements including sodium as impurity components were determined for the silica-based polishing particle (A), and the results are shown in Table 1 and Table 2 (the same applies hereinafter).

<<Measurement of Average Particle Diameter>>

The average particle diameter (d) was determined as follows: an electron micrograph of a silica-based particle was taken and 100 particles were arbitrarily selected therefrom; the longest diameter of the primary particle(s) was measured for each of the 100 particles as illustrated in FIG. 1; and the average value was used as the average particle diameter (d).

<<Measurement of Aspect Ratio>>

The aspect ratio was determined as follows: an electron micrograph of a silica-based particle was taken; the longest side of a rectangle enclosing a particle or particles was defined as the side b as illustrated in FIG. 2 and the vertical-to-horizontal ratio was measured for 100 particles arbitrarily selected; and the average value was used as the aspect ratio.

<<Measurement of Average Major Axis Diameter>>

An electron micrograph of a silica-based particle was taken and 100 particles were arbitrarily selected therefrom; the longest side of a rectangle enclosing a particle or particles was defined as the side b as illustrated in FIG. 2; and the average value was used as the average major axis diameter (b).

<<Measurement of Alkoxy Group>>

A dispersion of a silica-based particle was dried at 150° C., and subjected to measurement with a Fourier transform infrared spectrometer (manufactured by JASCO Corporation, model: FT/IR-6100) to determine the presence or absence of an alkoxy group (—OR group) in the silica-based particle.

<<Measurement of Carbon Content>>

A dispersion of a silica-based particle was dried at 150° C., and subjected to measurement with a carbon/sulfur analyzer (manufactured by HORIBA, Ltd., EMIA-320V) to determine the carbon content of the silica-based particle.

<<Measurement of Contents of Metal Elements>>

The silica-based particle according to the present invention was dissolved in hydrofluoric acid, and heated to remove the hydrofluoric acid, and then pure water was added thereto, as necessary, and the resulting solution was subjected to measurement with an inductively coupled plasma (ICP) emission mass spectrometer (manufactured by Shimadzu Corporation, ICPM-8500) to determine the contents of alkali metals, alkali earth metals, Fe, Ti, Zn, Pd, Ag, Mn, Co, Mo, Sn, Al, and Zr, the contents of Cu, Ni, and Cr, and the contents of U and Th in the silica-based particle.

<<Measurement of Dynamic Light Scattering Particle Diameter>>

The dynamic light scattering particle diameter (γ) was measured for the silica-based polishing particle, which had been diluted to 0.1% with aqueous ammonia having pH of 10.5, with a dynamic light scattering particle size distribution analyzer (manufactured by Otsuka Electronics Co., Ltd., PAR-III), and the cumulant particle diameter was used as the dynamic light scattering particle diameter γ.

<<Measurement of Equivalent Spherical Particle Diameter>>

A dispersion of a silica-based particle was dried at 150° C., and subjected to a BET method with a specific surface area analyzer (manufactured by Mountech Co., Ltd., Macsorb-1200) to determine the equivalent spherical particle diameter ($\gamma^1$). Specifically, the specific surface area (SA) was calculated from the amount of adsorption of nitrogen by using a BET single-point method, and the equivalent spherical particle diameter ($\gamma^1$) was calculated with the density of silica defined as 2.2 by using the equation "equivalent spherical particle diameter ($\gamma^1$)=6000/(SA×density)."

<Production of Abrasive (A)>

An abrasive (A) containing 3.0% by mass of the silica-based polishing particle, 175 ppm of hydroxyethyl cellulose (HEC), and 225 ppm of ammonia was produced.

<Substrate for Polishing>

In order to evaluate the performance in primary polishing, a single crystal silicon wafer having a crystal structure of (1.0.0) was used.

<<Polishing Test>>

The substrate for polishing was set in a polishing machine (manufactured by Nano Factor Co., Ltd., NF300), and polished by use of a polishing pad SUBA600 with a load of 15 kPa applied to the substrate at a table rotation speed of 50 rpm and a spindle speed of 60 rpm while the abrasive (A) was fed at a rate of 250 mL/min for 10 minutes. Thereafter, the substrate was washed with pure water and air-dried. Then, reduction in weight of the substrate for polishing was measured and the polishing rate was calculated. The polished surface of the resulting polished substrate was observed, and the smoothness of the surface was evaluated by using the following criteria (degree of scratches). The results are shown in Table 3.

No scratch was found: Very good
A few small scratches were found: Good
Small scratches were found over a wide area: Fair
Large scratches were found in a scattered manner: Poor
Large scratches were found over a wide area: Very poor The number of "particle residues" on the polished substrate was counted by using a laser microscope (manufactured by KEYENCE CORPORATION, VK-X250), and evaluated by using the following criteria. The results are shown in Table 3.

0 "particle residue": Very good
1 to 10 "particle residues": Good
11 to 50 "particle residues": Fair
51 to 100 "particle residues": Poor
101 or more "particle residues": Very poor <<Total Rating>>

In view of the result of the polishing test and use as the abrasive for highly-integrated semiconductor circuits, the performance as an abrasive for primary polishing was totally determined. The rating results were classified as below. The results are shown in Table 3.

Very suitable as an abrasive: Very good
Suitable as an abrasive: Good
Acceptable as an abrasive: Fair
Unsuitable as an abrasive: Poor
Very unsuitable as an abrasive: Very poor Example 2

<Production of Silica-Based Polishing Particle (B), Production of Abrasive (B), and Polishing Test>

A mixed solvent of 139.1 g of pure water and 169.9 g of methanol was held at 50° C., and thereto 2826.5 g of a mixed solution of tetramethoxysilane (manufactured by Tama Chemicals Co., Ltd., methyl silicate, $SiO_2$=39.6% by mass (the same applies hereinafter)) and methanol (obtained by dissolving 376.5 g of tetramethoxysilane in 2450 g of methanol) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3731.9 g. Thereafter, unreacted tetramethoxysilane, methanol, and ammonia were almost completely removed through an ultrafiltration membrane with 14927.6 g of pure water the weight of which corresponds to four times the weight of the aged product, and the carbon content derived from the alkoxy group was reduced to adjust the concentration to 1% by mass. Thereafter, the pH was adjusted to 3.0 with hydrochloric acid, and aging was performed in an autoclave at 150° C. for 4 hours. Then, the resultant was purified with an amphoteric ion exchange resin and concentrated with an ultrafiltration membrane to afford a dispersion of a silica-based polishing particle (B) having a solid content concentration of 20% by mass.

An abrasive (B) was produced in the same manner as in Example 1 except that the silica-based polishing particle (B) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 3

<Production of Silica-Based Polishing Particle (C), Production of Abrasive (C), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3731.9 g. Thereafter, unreacted tetramethoxysilane, methanol, and ammonia were almost completely removed through an ultrafiltration membrane with 14927.6 g of pure water the weight of which corresponds to four times the weight of the aged product, and the carbon content derived from the alkoxy group was reduced to adjust the concentration to 1% by mass. Thereafter, the pH was adjusted to 3.0 with hydrochloric acid, and aging was performed in an autoclave at 250° C. for 48 hours. Then, the resultant was purified with an amphoteric ion exchange resin and concentrated with an ultrafiltration membrane to afford a dispersion of a silica-based polishing particle (C) having a solid content concentration of 20% by mass.

An abrasive (C) was produced in the same manner as in Example 1 except that the silica-based polishing particle (C) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 4

<Production of Silica-Based Polishing Particle (D), Production of Abrasive (D), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3731.9 g. Thereafter, unreacted tetramethoxysilane, methanol, and ammonia were almost completely removed through an ultrafiltration membrane with 29855.2 g of pure water the weight of which corresponds to four times the weight of the aged product, and the carbon content derived from the alkoxy group was reduced to adjust the concentration to 1% by mass. Thereafter, the pH was adjusted to 3.0 with hydrochloric acid, and aging was performed in an autoclave at 150° C. for 4 hours. Then, the resultant was purified with an amphoteric ion exchange resin and concentrated with an ultrafiltration membrane to afford a dispersion of a silica-based polishing particle (D) having a solid content concentration of 20% by mass.

An abrasive (D) was produced in the same manner as in Example 1 except that the silica-based polishing particle (D) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 5

<Production of Silica-Based Polishing Particle (E), Production of Abrasive (E), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3731.9 g. Thereafter, unreacted tetramethoxysilane, methanol, and ammonia were almost completely removed through an ultrafiltration membrane with 14927.6 g of pure water the weight of which corresponds to four times the weight of the aged product, and the carbon content derived from the alkoxy group was reduced to adjust the concentration to 1%; by mass. Thereafter, the pH was adjusted to 3.0 with hydrochloric acid, and aging was performed in an autoclave at 100° C. for 2 hours. Then, the resultant was purified with an amphoteric ion exchange resin and concentrated with an ultrafiltration membrane to afford a dispersion of a silica-based polishing particle (E) having a solid content concentration of 20% by mass.

An abrasive (E) was produced in the same manner as in Example 1 except that the silica-based polishing particle (E) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 6

<Production of Silica-Based Polishing Particle (F), Production of Abrasive (F), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3887.9 g. Thereafter, unreacted tetraethoxysilane, methanol, and ammonia were almost completely removed through an ultrafiltration membrane with 15551.6 g of pure water the weight of which corresponds to four times the weight of the aged product, the resultant was further washed through an ultrafiltration membrane with 38879 g of methanol the weight of which corresponds to ten times the weight of the aged product, and the carbon content derived from the alkoxy group was reduced to adjust the concentration to 1% by mass. Thereafter, the pH was adjusted to 3.0 with hydrochloric acid, and aging was performed in an autoclave at 100° C. for 2 hours. Then, the resultant was purified with an amphoteric ion exchange resin and concentrated with an ultrafiltration membrane to afford a dispersion of a silica-based polishing particle (F) having a solid content concentration of 20% by mass.

An abrasive (F) was produced in the same manner as in Example 1 except that the silica-based polishing particle (F) was used, and a polishing test was conducted in the same manner as in Example 1.

The equipment used was one lined with Teflon (R). The tetraethoxysilane, methanol, and ammonia used had been subjected to distillation to reduce impurity components including sodium, which are listed in Table 2, to a concentration of less than 0.01 ppb.

Example 7

<Production of Silica-Based Polishing Particle (G), Production of Abrasive (G), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3731.9 g. Thereafter, unreacted tetramethoxysilane, methanol, and ammonia were almost completely removed through an ultrafiltration membrane with 29855.2 g of pure water the weight of which corresponds to eight times the weight of the aged product, and the carbon content derived from the alkoxy group was reduced to adjust the concentration to 1% by mass. Thereafter, the pH was adjusted to 3.0 with hydrochloric acid, and aging was performed in an autoclave at 150° C. for 4 hours. Then, the resultant was purified with an amphoteric ion exchange resin and concentrated with an ultrafiltration membrane to afford a dispersion of a silica-based polishing particle (G) having a solid content concentration of 20% by mass.

An abrasive (G) was produced in the same manner as in Example 1 except that the silica-based polishing particle (G) was used, and a polishing test was conducted in the same manner as in Example 1.

The equipment used was a sodium glass container and an autoclave equipment made of SUS304. The tetramethoxysilane and methanol were used without distillation.

Example 8

<Production of Silica-Based Polishing Particle (H), Production of Abrasive (H), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 596.4 g of aqueous ammonia having a concentration of 0.50% by mass (catalyst/alkoxysilane mole ratio: 0.034) were simultaneously added over 20 hours. After the completion of the addition, aging was further performed at the same temperature for 3 hours. At that time, the weight of the resultant was 3731.9 g. Thereafter, unreacted tetramethoxysilane, methanol, and ammonia were almost completely removed through an ultrafiltration membrane with 14927.6 g of pure water the weight of which corresponds to four times the weight of the aged product, and the carbon content derived from the alkoxy group was reduced. The resultant was further washed with 37319 g of methanol the weight of which corresponds to ten times the weight of the aged product, the carbon content derived from the alkoxy group was further reduced, and replacement with water was then performed to adjust the concentration to 1% by mass. Thereafter, the pH was adjusted to 3.0 with hydrochloric acid, and aging was performed in an autoclave at 100° C. for 1 hour. Subsequently, the resultant was purified with an amphoteric ion exchange resin and then concentrated with an ultrafiltration membrane to afford a dispersion of a silica-based polishing particle (H) having a solid content concentration of 20% by mass.

An abrasive (H) was produced in the same manner as in Example 1 except that the silica-based polishing particle (H) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 9

<Production of Silica-Based Polishing Particle (I), Production of Abrasive (I), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 5.18 g of aqueous ammonia having a concentration of 28.8% by mass (catalyst/alkoxysilane mole ratio: 0.034) were simultaneously added over 20 hours. After the completion of the addition, aging was further performed at the same temperature for 3 hours. At that time, the weight of the resultant was 3140.68 g. Thereafter, unreacted tetramethoxysilane, methanol, and ammonia were almost completely removed through an ultrafiltration membrane with 12562.72 g of pure water the weight of which corresponds to four times the weight of the aged product, and the carbon content derived from the alkoxy group was reduced. The resultant was further washed with 31406.8 g of methanol the weight of which corresponds to ten times the weight of the aged product, the carbon content derived from the alkoxy group was further reduced, and replacement with water was then performed. Thereafter, the pH was adjusted to 3.0 with hydrochloric acid, and aging was performed in an autoclave at 100° C. for 2 hour. Subsequently, the resultant was purified with an amphoteric ion exchange resin and then concentrated with an ultrafiltration membrane to afford a dispersion of a silica-based polishing particle (I) having a solid content concentration of 20% by mass.

An abrasive (I) was produced in the same manner as in Example 1 except that the silica-based polishing particle (I) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 10

<Production of Silica-Based Polishing Particle (J), Production of Abrasive (J), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 5.18 g of aqueous ammonia having a concentration of 28.8% by mass (catalyst/alkoxysilane mole ratio: 0.034) were simultaneously added over 20 hours. After the completion of the addition, aging was further performed at the same temperature for 3 hours. At that time, the weight of the resultant was 3140.68 g. Thereafter, unreacted tetramethoxysilane, methanol, and ammonia were almost completely removed through an ultrafiltration membrane with 12562.72 g of pure water the weight of which corresponds to four times the weight of the aged product, and the carbon content derived from the alkoxy group was reduced. The resultant was further washed with 31406.8 g of methanol the weight of which corresponds to ten times the weight of the aged product, the carbon content derived from the alkoxy group was further reduced, and replacement with water was then performed. Thereafter, the pH was adjusted to 3.0 with hydrochloric acid, and aging was performed in an autoclave at 100° C. for 0.5 hour. Subsequently, the resultant was purified with an amphoteric ion exchange resin and then concentrated with an ultrafiltration membrane to afford a dispersion of a silica-based polishing particle (J) having a solid content concentration of 20% by mass.

An abrasive (J) was produced in the same manner as in Example 1 except that the silica-based polishing particle (J) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 11

<Production of Silica-Based Polishing Particle (K), Production of Abrasive (K), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 5.18 g of aqueous ammonia having a concentration of 28.8% by mass (catalyst/alkoxysilane mole ratio: 0.034) were simultaneously added over 20 hours. After the completion of the addition, aging was further performed at the same temperature for 3 hours. At that time, the weight of the resultant was 3140.68 g. Thereafter, unreacted tetramethoxysilane, methanol, and ammonia were almost completely removed through an ultrafiltration membrane with 12562.72 g of pure water the weight of which corresponds to four times the weight of the aged product, and the carbon content derived from the alkoxy group was reduced. The resultant was further washed with 31406.8 g of methanol the weight of which corresponds to ten times the weight of the aged product, the carbon content derived from the alkoxy group was further reduced, and replacement with water was then performed. Thereafter, the pH was adjusted to 3.0 with hydrochloric acid, and aging was performed in an autoclave at 150° C. for 20 hour. Subsequently, the resultant was purified with an amphoteric ion exchange resin and then concentrated with an ultrafiltration membrane to afford a dispersion of a silica-based polishing particle (K) having a solid content concentration of 20% by mass.

An abrasive (K) was produced in the same manner as in Example 1 except that the silica-based polishing particle (K) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 12

<Production of Silica-Based Polishing Particle (L), Production of Abrasive (L), and Polishing Test>

A mixed solvent of 139.1 g of pure water and 169.9 g of methanol was held at 60° C., and thereto 2982.5 g of a mixed solution of tetraethoxysilane and methanol (obtained by dissolving 532.5 g of tetraethoxysilane in 2450 g of methanol) and 5.18 g of aqueous ammonia having a concentration of 28.8% by mass (catalyst/alkoxysilane mole ratio: 0.035) were simultaneously added over 20 hours. After the completion of the addition, aging was further performed at the same temperature for 3 hours. At that time, the weight of the resultant was 3296.68 g. Thereafter, unreacted tetraethoxysilane, methanol, and ammonia were almost completely removed through an ultrafiltration membrane with 13186.72 g of pure water the weight of which corresponds to four times the weight of the aged product, and the carbon content derived from the alkoxy group was reduced. The resultant was further washed with 32966.8 g of methanol the weight of which corresponds to ten times the weight of the aged product, the carbon content derived from the alkoxy group was further reduced, and replacement with water was then performed to adjust the concentration to 1% by mass. Thereafter, the pH was adjusted to 3.0 with hydrochloric acid, and aging was performed in an autoclave at 150° C. for 20 hour. Subsequently, the resultant was purified with an amphoteric ion exchange resin and then concentrated with an ultrafiltration membrane to afford a dispersion of a silica-based polishing particle (L) having a solid content concentration of 20% by mass.

An abrasive (L) was produced in the same manner as in Example 1 except that the silica-based polishing particle (L) was used, and a polishing test was conducted in the same manner as in Example 1.

The equipment used was one lined with Teflon (R). The tetraethoxysilane, methanol, and ammonia used had been subjected to distillation to reduce impurity components including sodium, which are listed in Table 2, to a concentration of less than 0.01 ppb.

Example 13

<Production of Final-Polishing Particle (M), Production of Abrasive (M), and Polishing Test>

A mixed solvent of 139.1 g of pure water and 169.9 g of methanol was held at 60° C., and thereto 2716.3 g of a water-methanol solution of tetraethoxysilane (obtained by dissolving 266.3 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 10 hours. After the completion of the addition, aging was further performed at the same temperature for 3 hours. At that time, the weight of the resultant was 3621.75 g. Thereafter, unreacted tetraethoxysilane, methanol, and ammonia were almost completely removed through an ultrafiltration membrane with 10865.25 g of pure water the weight of which corresponds to three times the weight of the aged product (at this time, the carbon content derived from the alkoxy group was high). The resultant was further washed through an ultrafiltration membrane with 36217.5 g of methanol the weight of which corresponds to ten times the weight of the aged product, and replacement with water was then performed with pure water by using an ultrafiltration membrane to adjust the concentration to 1% by mass. Thereafter, the pH was adjusted to 3.0 with hydrochloric acid, and aging was performed in an autoclave at 150° C. for 20 hours. The resultant was purified with an amphoteric ion exchange resin and then concentrated with an ultrafiltration membrane to afford a dispersion of a silica-based polishing particle (M) having a solid content concentration of 20% by mass.

An abrasive (M) was produced in the same manner as in Example 1 except that 2.8% by mass of the silica-based polishing particle (A) produced in Example 1 and 0.2% by mass of the silica-based polishing particle (M) were used, and a polishing test was conducted in the same manner as in Example 1.

The equipment used was one lined with Teflon (R). The tetraethoxysilane, methanol, and ammonia used had been subjected to distillation to reduce impurity components including sodium, which are listed in Table 2, to a concentration of less than 0.01 ppb.

Example 14

<Production of Silica-Based Polishing Particle (N), Production of Abrasive (N), and Polishing Test>

A mixed solvent of 139.1 g of pure water and 169.9 g of methanol was placed in a pressure container lined with Teflon and held at 120° C., and thereto 9808.18 g of a mixed solution of tetramethoxysilane and methanol (obtained by dissolving 7358.18 g of tetramethoxysilane in 2450 g of methanol) and 11331.6 g of aqueous ammonia having a concentration of 0.25% by mass (catalyst/alkoxysilane mole ratio: 0.034) were simultaneously added over 60 hours. After the completion of the addition, aging was further performed at the same temperature for 3 hours. At that time, the weight of the resultant was 21448.78 g. Thereafter, unreacted tetramethoxysilane, methanol, and ammonia were almost completely removed through an ultrafiltration membrane with 64346.34 g of pure water the weight of which corresponds to three times the weight of the aged product, the resultant was further washed through an ultrafiltration membrane with 257385.4 g of methanol the weight of which corresponds to twelve times the weight of the aged product, and replacement with water was then performed with pure water by using an ultrafiltration membrane to adjust the concentration to 1% by mass. Thereafter, the pH was adjusted to 3.0 with hydrochloric acid, and aging was performed in an autoclave for 150 hours. Then, the resultant was purified with an amphoteric ion exchange resin and concentrated with an ultrafiltration membrane to afford a dispersion of a silica-based polishing particle (N) having a solid content concentration of 20% by mass.

An abrasive (N) was produced in the same manner as in Example 1 except that 2.8% by mass of the silica-based polishing particle (N) and 0.2% by mass of the silica-based polishing particle (M) produced in Example 13 were used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 15

<Production of Silica-Based Polishing Particle (O), Production of Abrasive (O), and Polishing Test>

A mixed solvent of 139.1 g of pure water and 169.9 g of methanol was held at 10° C., and thereto 2451.6 g of a mixed solution of tetramethoxysilane and methanol (obtained by dissolving 1.6 g of tetramethoxysilane in 2450 g of methanol) and 2.50 g of aqueous ammonia having a concentration of 0.25% by mass (catalyst/alkoxysilane mole ratio: 0.034) were simultaneously added over 1 second. After the completion of the addition, aging was further performed at the same temperature for 3 hours. At that time, the weight of the resultant was 2763.1 g. Thereafter, unreacted tetramethoxysilane, methanol, and ammonia were almost completely removed through an ultrafiltration membrane with 22104.8 g of pure water the weight of which corresponds to eight times the weight of the aged product, and the carbon content derived from the alkoxy group was reduced to adjust the concentration to 1% by mass. Thereafter, the pH was adjusted to 3.0 with hydrochloric acid, and aging was performed in an autoclave at 200° C. for 3 hours. Then, the resultant was purified with an amphoteric ion exchange resin and concentrated with an ultrafiltration membrane to afford a dispersion of a silica-based polishing particle (O) having a solid content concentration of 20% by mass.

An abrasive (O) was produced in the same manner as in Example 1 except that the silica-based polishing particle (O) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 16

<Production of Silica-Based Polishing Particle (N), Production of Abrasive (P), and Polishing Test>

An abrasive (P) was produced in the same manner as in Example 1 except that the silica-based polishing particle (N) produced in Example 14 was used, and a polishing test was conducted in the same manner as in Example 1.

Example 17

<Production of Silica-Based Polishing Particle (Q), Production of Abrasive (Q), and Polishing Test>

A mixed solvent of 139.1 g of pure water and 169.9 g of methanol was placed in a pressure container lined with Teflon and held at 120° C., and thereto 13830.1 g of a mixed solution of tetramethoxysilane and methanol (obtained by dissolving 11380.1 g of tetramethoxysilane in 2450 g of methanol) and 17282 g of aqueous ammonia having a concentration of 0.25% by mass (catalyst/alkoxysilane mole ratio: 0.034) were simultaneously added over 80 hours. After the completion of the addition, aging was further performed at the same temperature for 3 hours. At that time, the weight of the resultant was 31421.1 g. Thereafter, unreacted tetramethoxysilane, methanol, and ammonia were almost completely removed through an ultrafiltration membrane with 94263.3 g of pure water the weight of which corresponds to three times the weight of the aged product, the resultant was further washed through an ultrafiltration membrane with 377053.2 g of methanol the weight of which corresponds to twelve times the weight of the aged product, and replacement with water was then performed with pure water by using an ultrafiltration membrane to adjust the concentration to 1% by mass. Thereafter, the pH was adjusted to 3.0 with hydrochloric acid, and aging was performed in an autoclave for 150 hours. Then, the resultant was purified with an amphoteric ion exchange resin and concentrated with an ultrafiltration membrane to afford a dispersion of a silica-based polishing particle (Q) having a solid content concentration of 20% by mass.

An abrasive (Q) was produced in the same manner as in Example 1 except that the silica-based polishing particle (Q) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Example 18

<Production of Silica-Based Polishing Particle (R), Production of Abrasive (R), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3731.9 g. Thereafter, unreacted tetramethoxysilane, methanol, and ammonia were almost completely removed through an ultrafiltration membrane with 29855.2 g of pure water the weight of which corresponds to twenty times the weight of the aged product, and the carbon content derived from the alkoxy group was reduced to adjust the concentration to 1% by mass. Thereafter, the pH was adjusted to 3.0 with hydrochloric acid, and aging was performed in an autoclave at 150° C. for 10 hours. Then, the resultant was purified with an amphoteric ion exchange resin and concentrated with an ultrafiltration membrane to afford a dispersion of a silica-based polishing particle (R) having a solid content concentration of 20% by mass.

An abrasive (R) was produced in the same manner as in Example 1 except that the silica-based polishing particle (R) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Comparative Example 1

<Production of Silica-Based Polishing Particle (RF-A), Production of Abrasive (RF-A), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25.% by mass (catalyst/alkoxysilane mole ratio: 0.034) were simultaneously added over 20 hours. After the completion of the addition, aging was further performed at the same temperature for 3 hours. At that time, the weight of the resultant was 3887.9 g. Thereafter, unreacted tetraethoxysilane, methanol, and ammonia were almost completely removed through an ultrafiltration membrane with 11663.7 g of pure water the weight of which corresponds to three times the weight of the aged product (at this time, the carbon content derived from the alkoxy group was high). The resultant was further washed through an ultrafiltration membrane with 38879 g of methanol the weight of which corresponds to ten times the weight of the aged product, and replacement with water was then performed with pure water by using an ultrafiltration membrane to adjust the concentration to 1% by mass. Thereafter, the pH was adjusted to 10 with ammonia, and aging was performed in an autoclave at 150° C. for 20 hours. The resultant was purified with an amphoteric ion exchange resin and then concentrated with an ultrafiltration membrane to afford a dispersion of a silica-based polishing particle (RF-A) having a solid content concentration of 20% by mass.

An abrasive (RF-A) was produced in the same manner as in Example 1 except that the silica-based polishing particle (RF-A) was used, and a polishing test was conducted in the same manner as in Example 1.

The equipment used was one lined with Teflon (R). The tetraethoxysilane, methanol, and ammonia used had been subjected to distillation to reduce impurity components including sodium, which are listed in Table 2, to a concentration of less than 0.01 ppb.

Comparative Example 2

<Production of Silica-Based Polishing Particle (RF-B), Production of Abrasive (RF-B), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3887.9 g. Thereafter, unreacted tetraethoxysilane, methanol, and ammonia were almost completely removed through an ultrafiltration membrane with 11663.7 g of pure water the weight of which corresponds to three times the weight of the aged product (at this time, the carbon content derived from the alkoxy group was high). Subsequently, the resultant was purified with an amphoteric ion exchange resin and then concentrated with an ultrafiltration membrane to afford a dispersion of a silica-based polishing particle (RF-B) having a solid content concentration of 20% by mass.

An abrasive (RF-B) was produced in the same manner as in Example 1 except that the silica-based polishing particle (RF-B) was used, and a polishing test was conducted in the same manner as in Example 1.

The equipment used was one lined with Teflon (R). The tetraethoxysilane, methanol, and ammonia used had been subjected to distillation to reduce impurity components including sodium, which are listed in Table 2, to a concentration of less than 0.01 ppb.

Comparative Example 3

<Production of Silica-Based Polishing Particle (RF-C), Production of Abrasive (RF-C), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 5.18 g of aqueous ammonia having a concentration of 28.8% by mass (catalyst/alkoxysilane mole ratio: 0.034) were simultaneously added over 20 hours. After the completion of the addition, aging was further performed at the same temperature for 3 hours. At that time, the weight of the resultant was 3140.68 g. Thereafter, unreacted tetramethoxysilane, methanol, and ammonia were removed through an ultrafiltration membrane with 3140.68 g of pure water, the weight of which is equal to the weight of the aged product, to reduce the carbon content derived from the alkoxy group, and replacement with water was then performed by using a rotary evaporator. Subsequently, the resultant was purified with an amphoteric ion exchange resin and then concentrated with an ultrafiltration membrane to afford a dispersion of a silica-based polishing particle (RF-C) having a solid content concentration of 20% by mass.

An abrasive (RF-C) was produced in the same manner as in Example 1 except that the silica-based polishing particle (RF-C) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

Comparative Example 4

<Production of Silica-Based Polishing Particle (RF-D), Production of Abrasive (RF-D), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3887.9 g. Thereafter, unreacted tetraethoxysilane, methanol, and ammonia were almost completely removed through an ultrafiltration membrane with 11663.7 g of pure water the weight of which corresponds to three times the weight of the aged product, the resultant was further washed through an ultrafiltration membrane with 38879 g of methanol the weight of which corresponds to ten times the weight of the aged product, and replacement with water was then performed with pure water by using an ultrafiltration membrane to adjust the concentration to 1% by mass. Thereafter, the pH was adjusted to 3.0 with hydrochloric acid, and aging was performed in an autoclave at 350° C. for 20 hours. The resultant was purified with an amphoteric ion exchange resin and then concentrated with an ultrafiltration membrane to afford a dispersion of a silica-based polishing particle (RF-D) having a solid content concentration of 20% by mass.

An abrasive (RF-D) was produced in the same manner as in Example 1 except that the silica-based polishing particle (RF-D) was used, and a polishing test was conducted in the same manner as in Example 1.

The equipment used was one lined with Teflon (R). The tetraethoxysilane, methanol, and ammonia used had been subjected to distillation to reduce impurity components including sodium, which are listed in Table 2, to a concentration of less than 0.01 ppb.

Comparative Example 5

<Production of Silica-Based Polishing Particle (RF-E), Production of Abrasive (RF-E), and Polishing Test>

A mixed solvent of 139.1 g of pure water and 169.9 g of methanol was held at 60° C., and thereto 2982.5 g of a water-methanol solution of tetraethoxysilane (obtained by dissolving 532.5 g of tetraethoxysilane in 2450 g of a water/methanol (mass ratio: 2/8) mixed solvent) and 596.4 g of aqueous ammonia having a concentration of 0.25% by mass (catalyst/alkoxysilane mole ratio: 0.034) were simultaneously added over 20 hours. After the completion of the addition, aging was further performed at the same temperature for 3 hours. At that time, the weight of the resultant was 3887.9 g. Thereafter, unreacted tetraethoxysilane, methanol, and ammonia were almost completely removed through an ultrafiltration membrane with 11663.7 g of pure water the weight of which corresponds to three times the weight of the aged product, and the resultant was adjusted the concentration to 1% by mass. Thereafter, the pH was adjusted to 3.0 with hydrochloric acid, and aging was performed in an autoclave at 250° C. for 20 hours. The resultant was purified with an amphoteric ion exchange resin and then concentrated with an ultrafiltration membrane to afford a dispersion of a silica-based polishing particle (RF-E) having a solid content concentration of 20% by mass.

An abrasive (RF-E) was produced in the same manner as in Example 1 except that the silica-based polishing particle (RF-E) was used, and a polishing test was conducted in the same manner as in Example 1.

The equipment used was one lined with Teflon (R). The tetraethoxysilane, methanol, and ammonia used had been subjected to distillation to reduce impurity components including sodium, which are listed in Table 2, to a concentration of less than 0.01 ppb.

Comparative Example 6

<Production of Silica-Based Polishing Particle (RF-F), Production of Abrasive (RF-F), and Polishing Test>

A mixed solvent of 139.1 g of pure water and 169.9 g of methanol was held at 50° C., and thereto 2826.5 g of a mixed solution of tetramethoxysilane and methanol (obtained by dissolving 376.5 g of tetramethoxysilane in 2450 g of methanol) and 5.18 g of aqueous ammonia having a concentration of 28.8% by mass (catalyst/alkoxysilane mole ratio: 0.034) were simultaneously added over 20 hours. After the completion of the addition, aging was further performed at the same temperature for 3 hours. At that time, the weight of the resultant was 3140.68 g. Thereafter, unreacted tetramethoxysilane, methanol and ammonia and any carbon source derived from the alkoxy group were almost completely removed through an ultrafiltration membrane with 471102 g of methanol the weight of which corresponds to 150 times the weight of the aged product, and replacement with water was then performed. Thereafter, the pH was adjusted to 11 with ammonia and aging was performed in an autoclave at 150° C. for 3 hours. Subsequently, the resultant was purified with an amphoteric ion exchange resin and then concentrated with an ultrafiltration membrane to afford a dispersion of a silica-based polishing particle (RF-F) having a solid content concentration of 20% by mass.

An abrasive (RF-F) was produced in the same manner as in Example 1 except that the silica-based polishing particle (RF-F) was used, and a polishing test was conducted in the same manner as in Example 1.

The equipment used was one lined with Teflon (R). The tetramethoxysilane, methanol, and ammonia used had been subjected to distillation to reduce impurity components including sodium, which are listed in Table 2, to a concentration of less than 0.01 ppb.

TABLE 1

| | | Silica particle | | | | | | | | |
|---|---|---|---|---|---|---|---|---|---|---|
| | Alkoxysilane raw material | Average particle diameter d nm | Aspect ratio | Average major axis diameter b nm | Dynamic light scattering particle diameter $\gamma$ nm | Equivalent spherical particle diameter $\gamma^1$ nm | Dynamic light scattering particle diameter/ average major axis diameter $\gamma/b$ | Equivalent spherical particle diameter/ average particle diameter $\gamma1/d$ | Alkoxy residue | Carbon content as C % by mass |
| Example 1 | TEOS | 30 | 1.50 | 45 | 50 | 30 | 1.11 | 1.00 | presence | 0.10 |
| Example 2 | TMOS | 30 | 1.30 | 39 | 45 | 30 | 1.15 | 1.00 | presence | 0.10 |
| Example 3 | TMOS | 30 | 4.50 | 135 | 80 | 30 | 0.59 | 1.00 | presence | 0.10 |
| Example 4 | TMOS | 30 | 1.50 | 45 | 58 | 30 | 1.29 | 1.00 | presence | 0.05 |
| Example 5 | TMOS | 30 | 1.50 | 45 | 40 | 30 | 0.89 | 1.00 | presence | 0.30 |
| Example 6 | TEOS | 30 | 1.50 | 45 | 38 | 30 | 0.84 | 1.00 | presence | 0.48 |
| Example 7 | TMOS | 30 | 1.50 | 45 | 58 | 30 | 1.29 | 1.00 | presence | 0.05 |
| Example 8 | TMOS | 30 | 1.50 | 45 | 55 | 28 | 1.22 | 0.93 | presence | 0.10 |
| Example 9 | TMOS | 30 | 1.50 | 45 | 60 | 27 | 1.33 | 0.90 | presence | 0.05 |
| Example 10 | TMOS | 30 | 1.50 | 45 | 55 | 25 | 1.22 | 0.83 | presence | 0.10 |
| Example 11 | TMOS | 30 | 1.50 | 45 | 50 | 30 | 1.11 | 1.00 | presence | 0.10 |
| Example 12 | TEOS | 30 | 1.50 | 45 | 45 | 30 | 1.00 | 1.00 | presence | 0.20 |
| Example 13 | TEOS | 30 | 1.50 | 45 | 50 | 30 | 1.11 | 1.00 | presence | 0.10 |
| | TEOS | 15 | 1.00 | 15 | 20 | 15 | 1.33 | 1.00 | presence | 0.10 |
| Example 14 | TMOS | 80 | 1.30 | 104 | 120 | 75 | 1.15 | 0.94 | presence | 0.05 |
| | TEOS | 15 | 1.00 | 15 | 20 | 15 | 1.33 | 1.00 | presence | 0.10 |
| Example 15 | TMOS | 5 | 1.80 | 9 | 12 | 4 | 1.33 | 0.80 | presence | 0.15 |
| Example 16 | TMOS | 80 | 1.30 | 104 | 120 | 75 | 1.15 | 0.94 | presence | 0.05 |
| Example 17 | TMOS | 120 | 1.30 | 135 | 160 | 120 | 1.19 | 1.00 | presence | 0.05 |
| Example 18 | TMOS | 30 | 1.50 | 45 | 58 | 30 | 1.29 | 1.00 | presence | 0.005 |
| Comparative Example 1 | TEOS | 30 | 1.00 | 30 | 35 | 30 | 1.17 | 1.00 | presence | 0.10 |
| Comparative Example 2 | TEOS | 25 | 1.00 | 25 | 24 | 25 | 0.96 | 1.00 | presence | 1.10 |
| Comparative Example 3 | TMOS | 30 | 1.50 | 45 | 55 | 29 | 1.22 | 0.97 | presence | 0.50 |
| Comparative Example 4 | TEOS | 35 | 6.20 | 217 | 140 | 35 | 0.65 | 1.00 | presence | 0.05 |
| Comparative Example 5 | TEOS | 30 | 1.50 | 45 | 55 | 29 | 1.22 | 0.97 | presence | 0.60 |
| Comparative Example 6 | TMOS | 30 | 1.50 | 45 | 55 | 29 | 1.22 | 0.97 | absence | 0.00 |

TABLE 2

| | Silica particle Contents of impurity components | | | | | | | | | | | | | |
|---|---|---|---|---|---|---|---|---|---|---|---|---|---|---|
| | Li | Na | K | Rb | Cs | Fr | Be | Mg | Ca | Sr | Ba | Ra | Fe | Ti |
| | | | | | | ppm | | | | | | | | |
| Example 1 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 2 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 3 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 4 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 5 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 6 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 7 | 0.000 | 1.100 | 0.010 | 0.000 | 0.000 | 0.000 | 0.000 | 0.010 | 0.020 | 0.000 | 0.000 | 0.000 | 0.010 | 0.000 |
| Example 8 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 9 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 10 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 11 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 12 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 13 | 0.000 | 0.020 | 0.010 | 0.000 | 0.000 | 0.000 | 0.000 | 0.010 | 0.020 | 0.000 | 0.000 | 0.000 | 0.010 | 0.000 |
| | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 14 | 0.000 | 0.020 | 0.010 | 0.000 | 0.000 | 0.000 | 0.000 | 0.010 | 0.020 | 0.000 | 0.000 | 0.000 | 0.010 | 0.000 |
| | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 15 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 16 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 17 | 0.000 | 0.020 | 0.010 | 0.000 | 0.000 | 0.000 | 0.000 | 0.010 | 0.020 | 0.000 | 0.000 | 0.000 | 0.010 | 0.000 |
| Example 18 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 1 | 0.000 | 0.020 | 0.010 | 0.000 | 0.000 | 0.000 | 0.000 | 0.010 | 0.020 | 0.000 | 0.000 | 0.000 | 0.010 | 0.000 |

TABLE 2-continued

| | Zn | Pd | Ag | Mn | Co | Mo | Sn | Al | Zr | Cu | Ni | Cr | U | Th |
|---|---|---|---|---|---|---|---|---|---|---|---|---|---|---|
| Comparative Example 2 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 3 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 4 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 5 | 0.000 | 0.020 | 0.010 | 0.000 | 0.000 | 0.000 | 0.000 | 0.010 | 0.020 | 0.000 | 0.000 | 0.000 | 0.010 | 0.000 |
| Comparative Example 6 | 0.000 | 0.020 | 0.010 | 0.000 | 0.000 | 0.000 | 0.000 | 0.010 | 0.020 | 0.000 | 0.000 | 0.000 | 0.010 | 0.000 |

| | Silica particle Contents of impurity components | | | | | | | | | | | | | |
|---|---|---|---|---|---|---|---|---|---|---|---|---|---|---|
| | Zn | Pd | Ag | Mn | Co ppm | Mo | Sn | Al | Zr | Cu | Ni ppb | Cr | U ppb | Th |
| Example 1 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 2 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 3 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 4 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 5 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 6 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 7 | 0.020 | 0.000 | 0.000 | 0.000 | 0.000 | 0.000 | 0.000 | 0.000 | 0.000 | 0.100 | 4.500 | 2.000 | 0.00 | 0.00 |
| Example 8 | 0.010 | 0.000 | 0.100 | 0.000 | 0.000 | 0.000 | 0.000 | 0.000 | 0.000 | 0.100 | 0.900 | 0.100 | 0.00 | 0.00 |
| Example 9 | 0.010 | 0.000 | 0.000 | 0.000 | 0.000 | 0.000 | 0.000 | 0.000 | 0.000 | 0.100 | 0.900 | 0.100 | 0.00 | 0.00 |
| Example 10 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 11 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 12 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 13 | 0.010 | 0.000 | 0.000 | 0.000 | 0.000 | 0.000 | 0.000 | 0.000 | 0.000 | 0.100 | 0.100 | 0.100 | 0.00 | 0.00 |
| | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 14 | 0.010 | 0.000 | 0.000 | 0.000 | 0.000 | 0.000 | 0.000 | 0.000 | 0.000 | 0.100 | 0.100 | 0.100 | 0.00 | 0.00 |
| | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 15 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 16 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 17 | 0.010 | 0.000 | 0.000 | 0.000 | 0.000 | 0.000 | 0.000 | 0.000 | 0.000 | 0.100 | 0.100 | 0.100 | 0.00 | 0.00 |
| Example 18 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 1 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 2 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 3 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 4 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 5 | 0.010 | 0.000 | 0.000 | 0.000 | 0.000 | 0.000 | 0.000 | 0.000 | 0.000 | 0.100 | 0.100 | 0.100 | 0.00 | 0.00 |
| Comparative Example 6 | 0.010 | 0.000 | 0.000 | 0.000 | 0.000 | 0.000 | 0.000 | 0.000 | 0.000 | 0.100 | 0.100 | 0.100 | 0.00 | 0.00 |

TABLE 3

| | Polishing test | | | | Total rating |
|---|---|---|---|---|---|
| | Polishing rate nm/min | Smoothness | Particle residue | Remarks | |
| Example 1 | 300 | Good | Very good | Applicable to the most advanced highly-integrated semiconductor devices | Good |
| Example 2 | 235 | Very good | Very good | Applicable to the most advanced highly-integrated semiconductor devices | Good |
| Example 3 | 450 | Fair | Very good | Applicable to the most advanced highly-integrated semiconductor devices | Good |
| Example 4 | 355 | Good | Very good | Applicable to the most advanced highly-integrated semiconductor devices | Very good |
| Example 5 | 255 | Very good | Good | Applicable to the most advanced highly-integrated semiconductor devices | Good |
| Example 6 | 248 | Very good | Fair | Applicable to the most advanced highly-integrated semiconductor devices | Good |
| Example 7 | 355 | Good | Very good | Applicable to highly-integrated semiconductor devices | Fair |
| Example 8 | 320 | Very good | Very good | Applicable to the most advanced highly-integrated semiconductor devices | Very good |
| Example 9 | 310 | Very good | Very good | Applicable to the most advanced highly-integrated semiconductor devices | Very good |
| Example 10 | 290 | Very good | Very good | Applicable to the most advanced highly-integrated semiconductor devices | Very good |
| Example 11 | 310 | Good | Very good | Applicable to the most advanced highly-integrated semiconductor devices | Good |
| Example 12 | 282 | Good | Good | Applicable to the most advanced highly-integrated semiconductor devices | Good |
| Example 13 | 365 | Good | Very good | Applicable to the most advanced highly-integrated semiconductor devices | Very good |
| Example 14 | 460 | Fair | Very good | Applicable to the most advanced highly-integrated semiconductor devices | Good |
| Example 15 | 40 | Very good | Very good | Applicable to the most advanced highly-integrated semiconductor devices | Very good |
| Example 16 | 400 | Fair | Very good | Applicable to the most advanced highly-integrated semiconductor devices | Good |
| Example 17 | 650 | Fair | Very good | Applicable to the most advanced highly-integrated semiconductor devices | Good |
| Example 18 | 550 | Fair | Very good | Applicable to the most advanced highly-integrated semiconductor devices | Good |
| Comparative Example 1 | 110 | Very good | Good | | Poor |

TABLE 3-continued

| | Polishing test | | | | |
|---|---|---|---|---|---|
| | Polishing rate nm/min | Smoothness | Particle residue | Remarks | Total rating |
| Comparative Example 2 | 90 | Very good | Poor | | Poor |
| Comparative Example 3 | 205 | Good | Poor | | Poor |
| Comparative Example 4 | 550 | Very poor | Very poor | | Very poor |
| Comparative Example 5 | 180 | Very good | Very poor | | Very poor |
| Comparative Example 6 | 360 | Very poor | Poor | | Poor |

What is claimed is:

1. A first silica-based polishing particle having a three-dimensional polycondensation structure, wherein
the particle contains an alkoxy group therein, the particle having an average particle diameter (d) of 5 to 300 nm, an aspect ratio of more than 1.20 and 5.00 or less, and a carbon content of 0.005% by mass or more and less than 0.50% by mass.

2. The first silica-based polishing particle according to claim 1, wherein
the particle includes a content of each of alkali metals, alkali earth metals, Fe, Ti, Zn, Pd, Ag, Mn, Co, Mo, Sn, Al, and Zr of less than 0.1 ppm, a content of each of Cu, Ni, and Cr is of less than 1 ppb, and a content of each of U and Th of less than 0.3 ppb.

3. The silica-based polishing particle according to claim 1, wherein a ratio ($\gamma$/b) of a dynamic light scattering particle diameter ($\gamma$) to an average major axis diameter (b) is 0.70 or more and 3.00 or less.

4. The first silica-based polishing particle according to claim 1, wherein a ratio ($\gamma^1$/d) of an equivalent spherical particle diameter ($\gamma^1$) calculated from a specific surface area (SA) in accordance with a BET method to the average particle diameter (d) is 0.80 or more and less than 1.00.

5. An abrasive comprising the first silica-based polishing particle according to claim 1.

6. The abrasive according to claim 5, wherein the abrasive is prepared by mixing a second silica-based polishing particle having a three-dimensional polycondensation structure, wherein
the second silica-based polishing particle contains an alkoxy group therein, the second silica-based polishing particle having an average particle diameter (d) of 5 to 300 nm, an aspect ratio of 1.00 or more and 1.20 or less, and a carbon content of 0.005% by mass or more and less than 0.50% by mass.

7. The abrasive according to claim 5, wherein the abrasive is an abrasive for primary polishing.

\* \* \* \* \*